(12) United States Patent
Kim et al.

(10) Patent No.: US 10,316,175 B2
(45) Date of Patent: Jun. 11, 2019

(54) POLYPROPYLENE RESIN COMPOSITION AND MOLDED PRODUCT THEREOF

(71) Applicants: HYUNDAI MOTOR COMPANY, Seoul (KR); KIA MOTORS CORPORATION, Seoul (KR); LG Hausys, Ltd., Seoul (KR); LOTTE CHEMICAL CORPORATION, Seoul (KR)

(72) Inventors: Hyun Gyung Kim, Hwaseong-si (KR); Ki Hyun Sung, Ulsan (KR); Seung Wook Park, Daejeon (KR); Chun Ho Park, Cheongju-si (KR); Young Gyu You, Daejeon (KR)

(73) Assignees: Hyundai Motor Company, Seoul (KR); Kia Motors Corporation, Seoul (KR); LG Hausys Ltd., Seoul (KR); Lotte Chemical Corporation, Seoul (KR)

( * ) Notice: Subject to any disclaimer, the term of this patent is extended or adjusted under 35 U.S.C. 154(b) by 0 days.

(21) Appl. No.: 15/853,126

(22) Filed: Dec. 22, 2017

(65) Prior Publication Data

US 2018/0258268 A1 Sep. 13, 2018

(30) Foreign Application Priority Data

Mar. 10, 2017 (KR) .................. 10-2017-0030705

(51) Int. Cl.
*C08L 23/12* (2006.01)

(52) U.S. Cl.
CPC .......... *C08L 23/12* (2013.01); *C08L 2205/025* (2013.01); *C08L 2205/035* (2013.01); *C08L 2207/04* (2013.01); *C08L 2207/14* (2013.01)

(58) Field of Classification Search
CPC ....... C08L 23/12; C08L 97/02; C08L 2205/08
See application file for complete search history.

(56) References Cited

U.S. PATENT DOCUMENTS

2016/0160017 A1* 6/2016 Lee .................. C08L 23/12
524/451

* cited by examiner

*Primary Examiner* — Frank J Vineis
*Assistant Examiner* — Lawrence D Ferguson
(74) *Attorney, Agent, or Firm* — Morgan Lewis & Bockius LLP

(57) ABSTRACT

A polypropylene resin composition includes a base resin including an isotactic polypropylene resin, a first atactic polypropylene resin, and a second atactic polypropylene resin; a thermoplastic elastomer; and an inorganic filler, in which a weight average molecular weight of the second atactic polypropylene resin is higher than a weight average molecular weight of the first atactic polypropylene resin.

19 Claims, No Drawings

POLYPROPYLENE RESIN COMPOSITION AND MOLDED PRODUCT THEREOF

CROSS-REFERENCE TO RELATED APPLICATION

This application claims under 35 U.S.C. § 119(a) the benefit of Korean Patent Application No. 10-2017-0030705 filed Mar. 10, 2017, the entire contents of which are incorporated herein by reference.

BACKGROUND

(a) Technical Field

The present disclosure relates to a polypropylene resin composition and a molded product thereof.

(b) Background Art

As interests in environment and energy have been recently increased, a demand for a resin composition having a low specific gravity has been increasing in order to reduce the weight of an automobile for reasons such as an improvement in fuel efficiency and air pollution problems in the automobile industry.

However, a resin having a low specific gravity needs to be capable of maintaining mechanical strength, dimensional stability, and processability at predetermined levels or more in order to be commercialized as an actual product. For this purpose, there has been a method for reinforcing mechanical properties of a polyolefin resin by mixing and stirring an inorganic filler such as talc and an impact reinforcing agent such as rubber with a polyolefin resin which has excellent chemical resistance and is an easily moldable universal plastic.

Attempts to achieve reduction in weight by significantly decreasing the thickness of a product have been recently made. However, when a product having a small thickness is manufactured as described above, there is a limitation in improving the strength of the product in the product, and there occur problems such as the product is shrunk or deformed as raw and secondary materials are introduced.

Thus, there is a need for developing a resin composition which simultaneously possesses excellent properties such as processability, mechanical properties, and dimensional stability even when applied to a molded product having a small thickness, while maintaining a low specific gravity.

The above information disclosed in this Background section is only for enhancement of understanding of the background of the disclosure and therefore it may contain information that does not form the prior art that is already known in this country to a person of ordinary skill in the art.

SUMMARY OF THE DISCLOSURE

The present disclosure has been made in an effort to solve the above-described problems associated with prior art.

In one aspect, the present disclosure provides a polypropylene resin composition including: a base resin including an isotactic polypropylene resin, a first atactic polypropylene resin, and a second atactic polypropylene resin; a thermoplastic elastomer; and an inorganic filler, in which a weight average molecular weight of the second atactic polypropylene resin is higher than a weight average molecular weight of the first atactic polypropylene resin.

In an aspect of the present disclosure, the isotactic polypropylene resin, the first atactic polypropylene resin, or the second atactic polypropylene resin is one selected from the group consisting of a random copolymer in which one comonomer selected from the group consisting of a homopolypropylene resin, propylene and ethylene, butylene, octene, and a combination thereof is polymerized, a block copolymer of polypropylene and ethylene-propylene rubber, and a combination thereof.

In an aspect of the present disclosure, the first atactic polypropylene resin has a weight average molecular weight in a range of about 10,000 g/mol to about 100,000 g/mol.

In an aspect of the present disclosure, the second atactic polypropylene resin has a weight average molecular weight in a range of about 1,000,000 g/mol to about 2,500,000 g/mol.

In an aspect of the present disclosure, the polypropylene resin composition comprises the base resin in an amount in a range of about 50 wt % to about 80 wt %.

In an aspect of the present disclosure, the base resin comprises the first atactic polypropylene resin in an amount in a range of about 80 parts by weight to about 160 parts by weight based on 100 parts by weight of the isotactic polypropylene resin.

In an aspect of the present disclosure, the base resin comprises the second atactic polypropylene resin in an amount in a range of about 30 parts by weight to about 150 parts by weight based on 100 parts by weight of the isotactic polypropylene resin.

In an aspect of the present disclosure, the thermoplastic elastomer comprises one selected from the group consisting of an olefin copolymer of ethylene and an α-olefin having 3 to 30 carbon atoms, a styrene-based copolymer, and a combination thereof.

In an aspect of the present disclosure, the thermoplastic elastomer is comprised in an amount in a range of about 1 part by weight to about 50 parts by weight based on 100 parts by weight of the base resin.

In an aspect of the present disclosure, the inorganic filler has an average diameter of 3 μm to 5 μm.

In an aspect of the present disclosure, the inorganic filler is comprised in an amount in a range of about 1 part by weight to about 50 parts by weight based on 100 parts by weight of the base resin.

In an aspect of the present disclosure, the polypropylene resin composition further comprises one additive selected from the group consisting of an antioxidant, a light stabilizer, a colorant, a plasticizer, a heat stabilizer, a slip agent, an antistatic agent, and a combination thereof.

In an aspect of the present disclosure, the polypropylene resin composition has a melt index in a range of about 30 g/10 min to about 100 g/10 min measured in accordance with ASTM D1238.

In another aspect, the present disclosure provides a molded product including an injection object of the polypropylene resin composition.

In an aspect of the present disclosure, the molded product has a flexural modulus in a range of about 2,000 MPa to about 2,800 MPa measured in accordance with ASTM D790.

In an aspect of the present disclosure, the molded product is used as an interior and exterior material for an automobile part including a bumper, a bumper cover, a side still molding, a door trim, a pillar trim.

In an aspect of the present disclosure, the molded product has a thickness less than 25 mm.

In an aspect of the present disclosure, the molded product has a thickness in a range of about 2.0 mm to about 2.5 mm.

In an aspect of the present disclosure, the molded product has a tensile strength of about 23 MPa.

In an aspect of the present disclosure, the molded product has an impact strength in a range of about 341 J/m to about 372 J/m.

Other aspects and preferred embodiments of the disclosure are discussed infra.

The polypropylene resin composition may simultaneously impart excellent processability and dimensional stability even when applied to a molded product having a small thickness, while maintaining a low specific gravity. Further, the polypropylene resin composition may simultaneously impart high tensile strength, flexural modulus, and impact strength.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

The above and other features of the disclosure are discussed infra.

DETAILED DESCRIPTION

Hereinafter reference will now be made in detail to various embodiments of the present disclosure, examples of which are illustrated in the accompanying drawings and described below. While the disclosure will be described in conjunction with exemplary embodiments, it will be understood that present description is not intended to limit the disclosure to those exemplary embodiments. On the contrary, the disclosure is intended to cover not only the exemplary embodiments, but also various alternatives, modifications, equivalents and other embodiments, which may be included within the spirit and scope of the disclosure as defined by the appended claims.

The benefits and features of the present disclosure, and the methods of achieving the benefits and features will become apparent with reference to Examples to be described below. However, the present disclosure is not limited to the Examples to be disclosed below, but may be implemented in various other forms, and the present Examples are only provided for rendering the disclosure of the present disclosure complete and for fully representing the scope of the disclosure to a person with ordinary skill in the art to which the present disclosure pertains, and the present disclosure will be defined only by the scope of the claims.

In one aspect, the present disclosure provides a polypropylene resin composition including: a base resin including an isotactic polypropylene resin, a first atactic polypropylene resin, and a second atactic polypropylene resin; a thermoplastic elastomer; and an inorganic filler, in which a weight average molecular weight of the second atactic polypropylene resin is higher than a weight average molecular weight of the first atactic polypropylene resin.

The polypropylene resin composition includes a base resin, a thermoplastic elastomer, and an inorganic filler, includes a first atatic polypropylene resin and a second atatic polypropylene resin having different weight average molecular weights together with an isotactic polypropylene resin as the base resin, and thus may simultaneously impart excellent processability, high tensile strength, flexural modulus, and impact strength, and dimensional stability even when applied to a molded product having a small thickness, while maintaining a low specific gravity.

In general, when a polypropylene resin composition includes an isotactic polypropylene as a polypropylene resin, mechanical properties may be improved due to high crystallinity, but in this case, there are problems in that fluidity is not easily adjusted, and dimensional stability deteriorates.

In the polypropylene resin composition, the fluidity and impact resistance may be reinforced by using a thermoplastic elastomer, but in this case, there is a problem in that the rigidity deteriorates. Furthermore, when other materials are used in order to reinforce fluidity and mechanical properties such as flexural strength and tensile strength of the polypropylene resin composition, fluidity and mechanical may not be both easily and sufficiently achieved because there is a problem of compatibility between the polypropylene resin and other resins or inorganic compounds.

The polypropylene resin composition includes an isotactic polypropylene resin as a base resin, and thus has high crystallinity and may impart excellent mechanical properties.

The base resin includes a first atatic polypropylene resin and a second atatic polypropylene resin having different weight average molecular weights together with the isotactic polypropylene resin. Specifically, the base resin includes a second atactic polypropylene resin having a weight average molecular weight higher than a weight average molecular weight of a first atactic polypropylene resin, and thus may improve molding processability by imparting high fluidity and simultaneously impart excellent mechanical rigidity and dimensional stability.

The base resin includes a first atatic polypropylene resin having a weight average molecular weight lower than a weight average molecular weight of a second atactic polypropylene resin, and thus may improve fluidity and impart excellent molding processability. For example, the first atactic polypropylene resin may have a weight average molecular weight of about 10,000 g/mol to about 100,000 g/mol.

The base resin may include the first atactic polypropylene resin in an amount of 80 parts by weight to 160 parts by weight based on 100 parts by weight of the isotactic polypropylene resin. When the content of the first atactic polypropylene resin is less than the range, the molding processability may deteriorate due to insufficient fluidity. When the content of the first atactic polypropylene resin is more than the range, mechanical properties such as impact strength may deteriorate.

The base resin includes a second atactic polypropylene resin having a weight average molecular weight higher than that of the first atatic polypropylene resin, and thus may simultaneously impart dimensional stability while maintaining excellent processability and reinforcing high tensile strength, flexural modulus, and impact strength. The second atactic polypropylene resin may have a weight average molecular weight of 1,000,000 g/mol to 2,500,000 g/mol.

The base resin may include the second atactic polypropylene resin in an amount of about 30 parts by weight to about 150 parts by weight based on 100 parts by weight of the isotactic polypropylene resin. Specifically, the base resin may include the second atactic polypropylene resin in an amount of about 30 parts by weight to about 80 parts by weight. When the content of the second atactic polypropylene resin is less than the range, mechanical properties may deteriorate, such as reduction in impact strength. When the content of the second atactic polypropylene resin is more than the range, the molding processability may deteriorate due to poor fluidity.

The isotactic polypropylene resin, the first atactic polypropylene resin, and the second atactic polypropylene resin may be one selected from the group consisting of a random copolymer in which one comonomer selected from the group consisting of a homopolypropylene resin, propylene and ethylene, butylene, octene, and a combination thereof is polymerized, a block copolymer of polypropylene and ethylene-propylene rubber, and a combination thereof.

The polypropylene resin composition includes the isotactic polypropylene resin, the first atactic polypropylene resin, and the second atactic polypropylene resin, which have different stereoscopic structures and weight average molecular weights of the polypropylene resin as the base resin, and thus may simultaneously impart excellent processability, high tensile strength, flexural modulus, and impact strength, and dimensional stability even when applied to a molded product having a small thickness, while maintaining a low specific gravity. That is, it is possible to impart excellent mechanical strength and dimensional stability without including another compatibilizer and another coupling agent or by only a compatibilizer and a coupling agent in a small content.

The polypropylene resin composition includes a base resin including the isotactic polypropylene resin, the first atactic polypropylene resin, and the second atactic polypropylene resin in an amount of about 50 wt % to about 80 wt %, and thus may impart excellent processability and mechanical properties while being economically feasible.

The polypropylene resin composition includes a thermoplastic elastomer, and thus may impart excellent impact strength.

The thermoplastic elastomer may include one selected from the group consisting of a copolymer of ethylene and an α-olefin having 3 to 30 carbon atoms, a styrene-based copolymer, and a combination thereof. The α-olefin having 3 to 30 carbon atoms may be one α-olefin compound selected from the group consisting of 1-propene, 1-butene, 1-pentene, 4-methyl-1-pentene, 1-hexene, 1-heptene, 1-octene, 1-decene, 1-undecene, 1-dodecene, 1-tetradecene, 1-hexadecene, 1-eicosene, and a combination thereof. For example, the olefin copolymer may be a block copolymer.

The styrene-based copolymer may be a copolymer selected from the group consisting of a styrene-ethylene copolymer, a styrene-butylene copolymer, a styrene-butylene-styrene copolymer, a styrene-ethylene-butylene-styrene copolymer, and a combination thereof. For example, the styrene-based copolymer may be a block copolymer.

The thermoplastic elastomer may be included in a content of about 1 part by weight to about 50 parts by weight based on 100 parts by weight of the base resin. Specifically, when the content of the thermoplastic elastomer is less than the range, the impact strength may deteriorate, and when the content is more than the range, the flowability may deteriorate, the dispersion force may be reduced, and flexural characteristics may deteriorate.

The polypropylene resin composition has excellent dispersibility by including an inorganic filler having an average diameter of about 3 µm to about 5 µm, and may impart an improved mechanical rigidity due to a large surface area, and may together impart dimensional stability. Specifically, when the average diameter of the inorganic filler is less than the range, the surface area is so large that there is a problem with compatibility of the inorganic filler with the base resin, and the rigidity may be decreased. Further, when the average diameter of the inorganic filler is more than the range, the mechanical strength such as impact strength deteriorates, so that when the inorganic filler is applied to a molded product having a small thickness, the molded product may be easily deformed or broken.

The inorganic filler may be one selected from the group consisting of talc, mica, whisker, and a combination thereof.

The inorganic filler may be included in a content of about 1 part by weight to about 50 parts by weight based on 100 parts by weight of the base resin. Specifically, when the content of the inorganic filler is less than the range, the polypropylene resin composition fails to exhibit improved mechanical properties, and when the content is more than the range, processability and appearance characteristics of a polypropylene resin composition may be decreased.

By appropriately mixing the base resin with the inorganic filler, the polypropylene resin composition may simultaneously impart excellent processability, high tensile strength, flexural modulus, and impact strength, and excellent dimensional stability even when applied to a molded product having a small thickness, while maintaining a low specific gravity.

The polypropylene resin composition may further include one additive selected from the group consisting of an antioxidant, a light stabilizer, a colorant, a plasticizer, a heat stabilizer, a slip agent, an antistatic agent, and a combination thereof.

An antioxidant may be one selected from the group consisting of a phenol-based antioxidant, a phosphite-based antioxidant, thiodipropionate, and a combination thereof.

A light stabilizer may be included in a polypropylene resin composition, and the light stabilizer may be one selected from the group consisting of a benzophenone-based light stabilizer, benzotriazole, HALS, and a combination thereof.

A colorant may be included in a polypropylene resin composition, and the colorant may be one selected from the group consisting of calcium, magnesium, titanium dioxide ($TiO_2$), and a combination thereof.

A plasticizer may be included in a polypropylene resin composition, and the plasticizer may be one selected from the group consisting of a terephthalate-based plasticizer, an aliphatic basic acid ester-based plasticizer, and a combination thereof. A heat stabilizer may be included in a polypropylene resin composition, and the heat stabilizer may be one selected from the group consisting of a sulfur-based heat stabilizer, a phosphorus-based heat stabilizer, and a combination thereof.

A slip agent improves scratch resistance by imparting a slip property to a surface of a molded product which is an injection object of the polypropylene resin composition, and may be one selected from the group consisting of a siloxane-based slip agent, an amide-based slip agent, and a combination thereof.

An antistatic agent may be included in a polypropylene resin composition, and the antistatic agent may be one selected from the group consisting of a stearate-based antistatic agent, an amine-based antistatic agent, and a combination thereof.

The polypropylene resin composition may have a melt index of about 30 g/10 min to about 100 g/10 min measured in accordance with ASTM D1238. The polypropylene resin composition may have a melt index within the range by adjusting the base resin, the thermoplastic elastomer, and the inorganic filler. Specifically, when the melt index of the polypropylene resin composition is less than the range, the flowability of resin when an injection molding is performed deteriorates, so that the molding processability may deteriorate. Furthermore, when the melt index of the polypropylene resin is more than the range, the impact resistance of the polypropylene resin composition containing the polypropylene resin may be decreased as the balance between rigidity and impact resistance of an injection object deteriorates.

In another aspect, the present disclosure provides a molded product including an injection object of the polypropylene resin composition. The molded product includes an injection object of the above-described polypropylene resin composition, and may simultaneously have excellent processability, high tensile strength, flexural modulus, and impact strength, and dimensional stability even when applied to a molded product having a small thickness, while maintaining a low specific gravity. The matters on the polypropylene resin composition are the same as those described above.

The molded product includes: a base resin including the isotactic polypropylene resin, the first atactic polypropylene resin, and the second atactic polypropylene resin as described above; a thermoplastic elastomer; and an inorganic filler, and may be manufactured by melting and extruding a polypropylene resin composition in which the second atactic polypropylene resin has a weight average molecular weight higher than a weight average molecular weight of the first atactic polypropylene resin by means of a twin-screw or more melt extruder. At this time, a screw rotation speed of the melt extruder may be about 200 rpm to about 1,000 rpm, and a residence time of the composition in the extruder may be about 5 sec to about 90 sec. Specifically, the screw rotation speed may be about 300 rpm to about 800 rpm, and the residence time may be about 10 sec to about 60 sec.

Specifically, it is possible to effectively induce a shear flow and an elongational flow required for kneading between resins and dispersion of the inorganic filler in an extruder by adjusting the screw rotation speed of the extruder to about 300 rpm or more. Further, it is possible to prevent the polypropylene and the inorganic filler from being degraded by adjusting the screw rotation speed to about 1,000 rpm or less. In addition, it is possible to sufficiently knead the resin, the inorganic filler, and the like of the composition, prevent degradation, and improve productivity by adjusting the residence time of the composition in the extruder to about 5 sec to about 90 sec.

The molded product may be used as an automobile interior and exterior material for parts such as a bumper cover, a side sill molding, a door trim, and a pillar trim.

Specifically, the molded product has a small thickness, and thus may further reduce the weight and simultaneously have excellent mechanical properties and dimensional stability. For example, the molded product may exhibit excellent mechanical properties and dimensional stability even in a thickness of less than about 2.5 mm. The molded product may have a thickness of about 2.0 mm to about 2.2 mm. Accordingly, the molded product may be suitable for being used as an interior and exterior material for an automobile, such as a bumper.

The molded product may have a flexural modulus of 2,000 MPa to 2,800 MPa measured in accordance with ASTM D790. The molded product is manufactured from the above-described polypropylene resin composition, and when a flexural modulus is less than the range, a molded product having a thickness of less than about 2.5 mm cannot withstand deformation and impact caused by external force when applied to a bumper, and the like, and thus cannot be used as internal and external materials of an automobile.

Hereinafter, specific examples of the present disclosure will be suggested. However, the Examples described below are only provided for specifically exemplifying or explaining the present disclosure, and the present disclosure is not limited thereby.

EXAMPLES

The following examples illustrate the disclosure and are not intended to limit the same.

Example 1

A polypropylene resin composition including: a base resin including JM-370 (PP, Lotte Chemical Corporation) as an isotactic polypropylene resin, LMW aPP (melt index 100 g/10 min, Lotte Chemical Corporation) as a first atactic polypropylene resin having a weight average molecular weight of 15,000 g/mol, and UHMW aPP (melt index 0.5 g/min, Lotte Chemical Corporation) as a second atactic polypropylene resin having a weight average molecular weight of 1,200,000 g/mol; EG-8842 (EOR, DOW) as a thermoplastic elastomer; and KC-3000 (d50 4 μm talc, KOCH) as an inorganic filler was prepared.

At this time, the isotactic polypropylene resin, the first atactic polypropylene resin, the second atactic polypropylene resin, the thermoplastic elastomer, and the inorganic filler were mixed at wt % of 30:25:10:20:15.

A sample was molded from the polypropylene resin composition by using an injection molding apparatus under extrusion conditions of an extrusion temperature of 160° C. to 210° C. and a screw rotation speed of 500 rpm using a twin-screw extruder (screw diameter 32 mm, L/D 40).

Example 2

A polypropylene resin composition was prepared in the same manner as in Example 1, except that the isotactic polypropylene resin, the first atactic polypropylene resin, the second atactic polypropylene resin, the thermoplastic elastomer, and the inorganic filler were mixed at wt % of 20:30:15:20:15.

Comparative Example 1

A polypropylene resin composition was prepared in the same manner as in Example 1, except that 65 wt % of JM-370 (PP, Lotte Chemical Corporation) as an isotactic polypropylene resin, 20 wt % of EG-8842 (EOR, DOW) as a thermoplastic elastomer, and 15 wt % of a talc having an average diameter of 5.5 μm to 11 μm as an inorganic filler were mixed.

Comparative Example 2

A polypropylene resin composition was prepared in the same manner as in Example 1, except that 65 wt % of JM-370 (PP, Lotte Chemical Corporation) as an isotactic polypropylene resin, 20 wt % of EG-8842 (EOR, DOW) as a thermoplastic elastomer, and 15 wt % of KC-3000 (d50 4 μm talc, KOCH) as an inorganic filler were mixed.

Comparative Example 3

A polypropylene resin composition was prepared in the same manner as in Example 1, except that 40 wt % of JM-370 (PP, Lotte Chemical Corporation) as an isotactic polypropylene resin, 25 wt % of LMW aPP (melt index 100 g/10 min, Lotte Chemical Corporation) as a first atactic polypropylene resin having a weight average molecular weight of 15,000 g/mol, 20 wt % of EG-8842 (EOR, DOW) as a thermoplastic elastomer, and 15 wt % of a talc having an average diameter of 5.5 μm to 11 μm as an inorganic filler were mixed.

Comparative Example 4

A polypropylene resin composition was prepared in the same manner as in Example 1, except that 45 wt % of JM-370 (PP, Lotte Chemical Corporation) as an isotactic polypropylene resin, 20 wt % of UHMW aPP (melt index 0.5 g/10 min, Lotte Chemical Corporation) as a second atactic polypropylene resin having a weight average molecular weight of 1,200,000 g/mol, 20 wt % of EG-8842 (EOR, DOW) as a thermoplastic elastomer, and 15 wt % of a talc having an average diameter of 5.5 μm to 11 μm as an inorganic filler were mixed.

were measured at 230° C. and under a load of 2.16 kg in accordance with ASTM D1238 method, and the results are shown in [Table 2].

Test Example 3: Tensile Strength

The tensile strengths of the samples prepared in the Examples and the Comparative Examples were measured by setting a sample size and a crosshead speed at 165×13×3.2 mm and 50 mm/min, respectively using ASTM D638 at 23° C., and the results are shown in [Table 2].

Test Example 4: Flexural Modulus

The flexural moduli of the samples prepared in the Examples and the Comparative Examples were measured by setting a sample size and a crosshead speed at 12.7×127×6.4 mm and 10 mm/min, respectively using ASTM D790, and the results are shown in [Table 2].

TABLE 1

| Classification | | Example 1 | Example 2 | Comparative Example 1 | Comparative Example 2 | Comparative Example 3 | Comparative Example 4 |
|---|---|---|---|---|---|---|---|
| Isotactic polypropylene | wt % | 30 | 20 | 65 | 65 | 40 | 45 |
| First atactic polypropylene | wt % | 25 | 30 | — | — | 25 | — |
| Second atactic polypropylene | wt % | 10 | 15 | — | — | — | 20 |
| Thermoplastic elastomer | wt % | 20 | 20 | 20 | 20 | 20 | 20 |
| Inorganic filler (Average diameter 5.5 μm to 11 μm) | wt % | — | — | 15 | — | 15 | 15 |
| Inorganic filler (Average diameter 3 μm to 5 μm) | wt % | 15 | 15 | — | 15 | — | — |

Test Examples

Evaluation

Test Example 1: Specific Gravity

The specific gravities of the samples obtained in the Examples and the Comparative Examples were measured in accordance with ASTM D792, and the results are shown in [Table 2].

Test Example 2: Melt Index (g/10 min)

The melt indices of the polypropylene resin compositions obtained in the Examples and the Comparative Examples

Test Example 5: IZOD Impact Strength

The IZOD impact strengths of the samples having a size of 63.5×12.7×6.4 mm prepared in the Examples and the Comparative Examples were measured at room temperature (23° C.) in accordance with ASTM D256, and the results are shown in [Table 2].

Test Example 6: Linear Expansion Coefficient

The linear expansion coefficients of the samples prepared in the Examples and the Comparative Examples were measured at a measurement interval of −30° C. to 80° C. by using ASTM D696, and the results are shown in [Table 2].

TABLE 2

| Classification | | Example 1 | Example 2 | Comparative Example 1 | Comparative Example 2 | Comparative Example 3 | Comparative Example 4 |
|---|---|---|---|---|---|---|---|
| Melt index | g/10 min | 42 | 41 | 25 | 26 | 49 | 8 |
| Specific gravity | — | 1 | 1 | 1 | 1 | 1 | 1 |

TABLE 2-continued

| Classification | | Example 1 | Example 2 | Comparative Example 1 | Comparative Example 2 | Comparative Example 3 | Comparative Example 4 |
|---|---|---|---|---|---|---|---|
| Tensile strength | MPa | 23 | 23 | 21 | 22 | 21 | 24 |
| Flexural modulus | MPa | 2,560 | 2,520 | 2,150 | 2,390 | 2,120 | 2,380 |
| IZOD (@23° C.) | J/m | 341 | 372 | 290 | 314 | 237 | 410 |
| Linear expansion coefficient | $-5 \times 10 \times 10^{-5}$ | 5.1 | 4.9 | 6.6 | 5.0 | 6.7 | 6.4 |

As shown in [Table 2], it could be seen that when the atactic polypropylene resin was not used, or the first atactic polypropylene resin having a low weight average molecular weight or the second atactic polypropylene resin having a high weight average molecular weight was included in the composition, physical properties such as tensile strength, flexural modulus, impact strength, and linear expansion coefficient of a molded product manufactured from the polypropylene resin composition failed to be evenly satisfied.

In contrast, it was confirmed that Examples 1 and 2 including all of the isotactic polypropylene resin, the first atactic polypropylene resin, and the second atactic polypropylene resin simultaneously had excellent flowability and mechanical properties and excellent dimensional stability due to a low linear expansion coefficient.

The disclosure has been described in detail with reference to preferred embodiments thereof. However, it will be appreciated by those skilled in the art that changes may be made in these embodiments without departing from the principles and spirit of the disclosure, the scope of which is defined in the appended claims and their equivalents.

What is claimed is:

1. A polypropylene resin composition comprising:
   a base resin comprising
      an isotactic polypropylene resin,
      a first atactic polypropylene resin, and
      a second atactic polypropylene resin;
   a thermoplastic elastomer; and
   an inorganic filler,
   wherein a weight average molecular weight of the second atactic polypropylene resin is higher than a weight average molecular weight of the first atactic polypropylene resin, and
   wherein the base resin comprises the first atactic polypropylene resin in an amount in a range of about 80 parts by weight to about 160 parts by weight based on 100 parts by weight of the isotactic polypropylene resin.

2. The polypropylene resin composition of claim 1, wherein the isotactic polypropylene resin, the first atactic polypropylene resin, or the second atactic polypropylene resin is one selected from the group consisting of a random copolymer in which one comonomer selected from the group consisting of a homopolypropylene resin, propylene and ethylene, butylene, octene, and a combination thereof is polymerized, a block copolymer of polypropylene and ethylene-propylene rubber, and a combination thereof.

3. The polypropylene resin composition of claim 1, wherein the first atactic polypropylene resin has a weight average molecular weight in a range of about 10,000 g/mol to about 100,000 g/mol.

4. The polypropylene resin composition of claim 1, wherein the second atactic polypropylene resin has a weight average molecular weight in a range of about 1,000,000 g/mol to about 2,500,000 g/mol.

5. The polypropylene resin composition of claim 1, wherein the polypropylene resin composition comprises the base resin in an amount in a range of about 50 wt % to about 80 wt %.

6. The polypropylene resin composition of claim 1, wherein the thermoplastic elastomer comprises one selected from the group consisting of an olefin copolymer of ethylene and an α-olefin having 3 to 30 carbon atoms, a styrene-based copolymer, and a combination thereof.

7. The polypropylene resin composition of claim 1, wherein the thermoplastic elastomer is comprised in an amount in a range of about 1 part by weight to about 50 parts by weight based on 100 parts by weight of the base resin.

8. The polypropylene resin composition of claim 1, wherein the inorganic filler is comprised in an amount in a range of about 1 part by weight to about 50 parts by weight based on 100 parts by weight of the base resin.

9. The polypropylene resin composition of claim 1, wherein the polypropylene resin composition further comprises one additive selected from the group consisting of an antioxidant, a light stabilizer, a colorant, a plasticizer, a heat stabilizer, a slip agent, an antistatic agent, and a combination thereof.

10. The polypropylene resin composition of claim 1, wherein the polypropylene resin composition has a melt index in a range of about 30 g/10 min to about 100 g/10 min measured in accordance with ASTM D1238.

11. A molded product comprising an injection object of the polypropylene resin composition according to claim 1.

12. The molded product of claim 11, wherein the molded product has a flexural modulus in a range of about 2,000 MPa to about 2,800 MPa measured in accordance with ASTM D790.

13. The molded product of claim 11, wherein the molded product is used as an interior and exterior material for an automobile part including a bumper, a bumper cover, a side still molding, a door trim, a pillar trim.

14. The molded product of claim 12, wherein the molded product has a thickness less than 25 mm.

15. The molded product of claim 14, wherein the molded product has a thickness in a range of about 2.0 mm to about 2.5 mm.

16. The molded product of claim 11, wherein the molded product has a tensile strength of about 23 MPa.

17. The molded product of claim 11, wherein the molded product has an impact strength in a range of about 341 J/m to about 372 J/m.

18. A polypropylene resin composition comprising:
a base resin comprising:
   an isotactic polypropylene resin,
   a first atactic polypropylene resin, and
   a second atactic polypropylene resin;
a thermoplastic elastomer; and
an inorganic filler,
wherein a weight average molecular weight of the second atactic polypropylene resin is higher than a weight average molecular weight of the first atactic polypropylene resin, and
wherein the base resin comprises the second atactic polypropylene resin in an amount in a range of about 30 parts by weight to about 150 parts by weight based on 100 parts by weight of the isotactic polypropylene resin.

19. A polypropylene resin composition comprising:
a base resin comprising
   an isotactic polypropylene resin,
   a first atactic polypropylene resin, and
   a second atactic polypropylene resin;
a thermoplastic elastomer; and
an inorganic filler,
wherein a weight average molecular weight of the second atactic polypropylene resin is higher than a weight average molecular weight of the first atactic polypropylene resin, and
wherein the inorganic filler has an average diameter of 3 µm to 5 µm.

* * * * *